United States Patent
Mourey et al.

[15] 3,705,143
[45] Dec. 5, 1972

[54] PRODUCTION OF CASEIN BY PASSAGE THROUGH A DUCT WITH A CONSTRICTION

[72] Inventors: Jean-Jacques Mourey, Lausanne; Ernest Badertscher, Orbe, both of Switzerland

[73] Assignee: Societe D'Assistance Technique Pour Produits Nestle S.A., Lausanne, Switzerland

[22] Filed: May 7, 1970

[21] Appl. No.: 35,591

[30] Foreign Application Priority Data

May 16, 1969 Switzerland...............7446/69

[52] U.S. Cl......................................260/120, 99/20
[51] Int. Cl..................................................B23j 1/20
[58] Field of Search......................................260/120

[56] References Cited

UNITED STATES PATENTS

| | | | |
|---|---|---|---|
| 2,184,002 | 12/1939 | Pagel | 260/120 |
| 2,369,095 | 2/1945 | Wendt | 260/120 |
| 2,807,608 | 9/1957 | Smart et al. | 260/120 |
| 917,062 | 4/1909 | Head | 260/120 |
| 3,389,131 | 6/1968 | Van Horn | 260/120 X |

OTHER PUBLICATIONS

Methods for Manufacturing Acid–Precipitated Casein from Skim Milk, Trimble et al., Dept. of Agriculture Bulletin, 1938, pp. 1– 36

Encyclopedia of Chem. Technology, Kirk et al., Vol. 3, pp. 225– 235

Encyclopedia of Polymer Science and Technology, Vol. 2, 1965, pp. 859– 863

Encyclopedia of Chemical Technology, Vol. 13, 1967, Kirk et al., pp. 513 and 567– 568

*Primary Examiner*—Howard E. Schain
*Attorney*—Blum, Moscovitz, Friedman & Kaplan

[57] ABSTRACT

Non-sticky, uniformly-sized casein particles are prepared by passing a casein slurry through a duct with a constriction, under flow conditions such that V·De is at least 600 cm$^2$ sec$^{-1}$, where V is the mean streaming velocity of the slurry and De the hydraulic equivalent diameter of the duct. Other features of the invention are disclosed in the following specification.

12 Claims, No Drawings

PRODUCTION OF CASEIN BY PASSAGE THROUGH A DUCT WITH A CONSTRICTION

The present invention concerns a process for isolating casein from skimmed milk and for preparing caseinates from the casein so produced.

Casein is the colloidal protein constituent of milk which is precipitated by rennet at a neutral or slightly acid pH, by a calcium salt or by acids at a pH value in the range of 4.6 to 4.7. It is a valuable high-protein raw material for many dietary and culinary applications, especially for the protein enrichment of foods.

Casein is generally separated from milk which has been skimmed. Usually, the casein is coagulated by means of a destabilizing agent, such as an acid, a mineral salt or rennet and may then be removed from the residual lactoserum by physical means such as centrifuging or filtration. If the milk is destabilized at ambient temperatures, the casein coagulates more or less spontaneously as the destabilizing agent is added and a coagulum of casein in lactoserum is obtained. However, if the milk is destabilized at a low temperature, coagulation does not take place immediately and a metastable suspension is produced which does not coagulate until the milk is warmed. This two-stage process has been operated in a continuous flow system in which the milk is destabilized in bulk in a low-temperature enclosure and is then pumped through a heating enclosure in which it is heated to coagulate the casein.

These methods are satisfactory when an end product such as cheese is required but do not give good results when the casein is to be separated from the lactoserum as a distinct product. The casein particles are of irregular size, are very sticky and do not possess sufficient mechanical rigidity to avoid clogging filters when they are separated from the lactoserum. This makes filtration under pressure practically impossible and after filtration the particles still contain large amounts of lactoserum which are washed out only with difficulty.

The casein particles become even more lumpy and sticky if, as is generally desirable, the casein/lactoserum slurry is pasteurized after coagulation.

It has now been found that these disadvantages may to a great extent be overcome in a continuous flow system by a certain combination of heating and flow conditions.

According to the invention, a process for separating casein from skimmed milk is characterized in that the milk is destabilized and heated to from 40° to 60° C with agitation to produce a slurry of casein in lactoserum, the slurry is then passed through a first duct having a constricted portion, the flow through said constricted portion having a V·De value of at least 600 cm² sec⁻¹, where V is the mean streaming velocity of the slurry and De is the hydraulic equivalent diameter of the duct, the slurry is then pasteurized and the casein is subsequently recovered from the slurry.

It has been found empirically that a characteristic parameter determining the structure of the casein particles in the slurry is the product of the mean streaming velocity V of the liquid and the hydraulic equivalent diameter De of the duct, where $$De = \frac{4 \times \text{filled section of the duct}}{\text{wetted circumference}}$$

At a given temperature, a given value of the V·De product will produce a similar grain structure for different rates of flow. In the case of a tube of circular cross-section, to obtain the same grain structure for different throughputs at the same temperature, the actual tube diameter d (in cm), throughput Q (liters/hour) and the V·De value (cm² sec⁻¹) are related by the formula $$d = Q/2.83 \, V \cdot De$$

The heating of the skimmed milk is preferably achieved by direct injection of steam which causes violent turbulence as well as a rapid rise in temperature.

The duct normally comprises a pipe through which the slurry is pumped and the constricted portion may comprise a simple diaphragm having an aperture which is smaller than the diameter of the pipe. The effect of the rapid heating and the constriction in the duct is to modify the grain size and structure as discussed below. By varying the conditions, which have to be determined empirically, different size distributions and mechanical properties of the casein grain can be obtained. By choosing optimum values of the various parameters, casein particles may be obtained which have substantially uniform grain size and which do not stick together, so that they do not plug the filters. These relatively rigid grains may also be washed without difficulty to remove residual lactoserum, and they do not stick together on subsequent handling.

To obtain non-sticky casein particles of uniform size, it has been found that the V·De value in the constricted portion should be at least 600 cm² sec⁻¹, preferably 1000 to 1500 cm² sec⁻¹.

While the scope of the invention is not to be limited by theoretical considerations it is believed that flow through the constriction produces two effects on the mixture:

a. Increase in the collision frequency of the particles by the displacement of one volume element relative to he next volume element of the streaming liquids, b. Higher shearing forces, which arise when the liquid passes through the constriction, tend to disintegrate large or loosely coagulated particles.

Both effects seem to contribute to the formation of an easily separable coagulum of substantially uniform particle size.

In a preferred embodiment of the invention, skimmed milk is first destabilized by addition of substances conventionally used for this purpose, for example rennet, an acid or a salt such as calcium chloride. Preferably, the milk is destabilized at a temperature not exceeding 10° C and when sufficient time has elapsed for the skimmed milk to be destabilized, it is pumped through a continuous flow system in which it is subjected to a number of distinct steps.

Firstly, the destabilized milk is rapidly heated with agitation, preferably to 45° to 55° C, by means of injection of steam which causes violent turbulence as well as a rapid rise in temperature. During destabilizing the appearance of the milk is unchanged and the casein does not form distinct particles: on injection of steam, however, a rapid coagulation takes place to give a slurry of casein particles in lactoserum.

After steam injection the slurry is passed through a tubular holding section in which it is held for a period of time, preferably from 0.5 to 1.0 minutes, during which time coagulation is completed. A $V \cdot De$ value of 250 to 600 $cm^2$ $sec^{-1}$, preferably 300 to 450 $cm^2$ $sec^{-1}$, is desirable in the holding tube after the first steam injection.

If the milk is destabilized by acid or by a mineral salt, it is possible to combine the destabilizing step with the coagulation step by injecting a solution of the acid or mineral salt into the stream of cold skimmed milk before or immediately after it reaches the steam injector. This is not practicable when rennet is used because of the long residence time (of the order of 1 hour) required before destabilization is complete. This injection method has the advantage that the process is completely continuous and all the milk is destabilized for an equal period of time.

After leaving the holding section, the slurry is passed through a duct having a constricted portion, advantageously a simple diaphragm, so that in this portion the velocity of flow is increased and turbulence is generated. The effect of this step, which is referred to herein as "size normalizing" is to modify the average grain size and the physical properties of the casein, as discussed above, to give particles of relatively even size which are easily separable from the lactoserum.

After passing the constricted portion, the slurry is preferably heated again by steam injection to pasteurization temperature, for example 65° to 80° C and is passed through a holding tube. The residence time for pasteurization is preferably of the order of 30 to 60 seconds. If desired, the slurry may then be subjected to a second size normalizing by passing it through a second constriction to give a product having a selected final grain size.

After pasteurization and a second size normalizing (if this is done) the slurry of lactoserum and casein particles is generally cooled, preferably to a temperature in the range 20° to 45° C. This may be done by passing the slurry through a heat exchanger in known manner.

After cooling, the casein particles may be separated from the lactoserum by any one of several known methods. The preferred method employs a vibrating screen to retain the particles of the desired size, for example a screen with 0.21 mm openings.

The separated casein is preferably washed to remove residual lactoserum and this may generally be done with water, for example at 10 to 40° C for a period of 5 to 15 minutes. The volume of water is preferably three to four times that of the casein and the washing time is adjusted to give the desired lactose content in the finished casein. The casein may be removed from the wash water containing residual lactoserum on a vibrating sieve or by means of a desludging centrifuge of known type.

If a dry product is desired, the washed casein may be dried by any conventional method, such as spray, roller or freeze-drying. One preferred procedure is to "wet mill" the slurry and to spray-dry the slurry.

After the temperature has been raised by the second steam injection the $V \cdot De$ value in the holding tube should preferably not exceed 400 $cm^2$ $sec^{-1}$. If the slurry is passed through a second constricted portion before cooling, the $V \cdot De$ value should desirably rise to 900 to 1900 $cm^2$ $sec^{-1}$, preferably 1000 to 1500 $cm^2$ $cm^{-1}$. When cooling of the slurry is effected in a tubular heat exchanger, the $V \cdot De$ value in the tubes should preferably not exceed 600 $cm^2$ $sec^{-1}$. In the above embodiment there are two size normalizing steps or two constricted portions, which effectively control the grain size and texture of the casein. Similar results may be obtained using only one size normalizing step but the use of two such stages is preferred since any variation in the process conditions during pasteurizing, or any major variations before the first constriction which are not accounted for by the first size normalizing, are taken care of in the second size normalizing.

It is possible to coagulate the casein by heating it directly to the pasteurization temperature of the order of 70° C, by steam injection, but this tends to produce large lumps of irregular size which are not effectively normalized by subsequent passage through a constriction having the characteristics discussed above.

The casein produced in accordance with the invention is in the form of relatively hard, free-flowing granules of uniform size which do not stick together. The product is much easier to handle than the sticky and uneven casein particles produced by some hitherto-known continuous processes.

When a caseinate, such as potassium, sodium or calcium caseinate is required, the required amount of alkali is added to the casein before drying. The alkali is preferably in the form of an aqueous solution or suspension of the hydroxide required, e.g. 30 percent potassium hydroxide or sodium hydroxide solution, or a 15 percent suspension of calcium hydroxide. The casein and alkali solution or suspension may be mixed in a mixer of standard design and the pH value of the mixture is preferably adjusted after mixing by adding further alkali or an acid as necessary to a pH value of from 6 to 7. The caseinate suspension may then be dried as for the manufacture of casein.

When the process is operated continuously, the pH of the mixture after adding the alkaline solution or suspension may be measured and the rate of addition of potassium hydroxide may be adjusted accordingly to give a caseinate suspension having the desired pH.

In order to obtain a product of smaller grain size than that obtained from the coagulation, the casein or caseinate particles may be wet milled, advantageously in a mill of conventional type, such as a "Fryma" mill.

If a dry product is desired, the wet particles of casein or caseinate may be dried by any conventional method such as spray-drying.

For a better understanding of the invention, the following examples are given by way of illustration only. The percentages are by weight.

EXAMPLE 1

Skimmed milk, containing 16 g of rennet per 1000 liters milk is held at a temperature of 10° C for a period of at least one hour. The mixture is then pumped at a rate of 4,200 liters/hour through a tubular holding section of 35 mm diameter. Before entering the holding section, steam is injected into the suspension to raise the temperature of the mixture to 45° to 50° C. The mixture passes through the holding section with a residence time of 32 seconds, with a $V \cdot De$ value of 450 $cm^2$ $sec^{-1}$, during which time the casein is coagulated.

The mixture is then passed through a normalizing diaphragm of 12 mm aperture with a $V \cdot De$ value of 1400 cu$^2$ sec$^{-1}$ before entering a pasteurizer containing tubular elements 55 mm in diameter. At the entrance of the pasteurizer, steam is injected to raise the temperature of the mixture to 70° C. The mixture passes through the pasteurizer with a residence time of 45 seconds at a $V \cdot De$ value of 300 cm$^2$ sec$^{-1}$, and is then passed through a second normalizing diaphragm of 12 mm aperture with a $V \cdot De$ value of 1400 cm$^2$ sec$^{-1}$. After the diaphragm the mixture passes through water-jacketed cooling tubes (35 mm diameter) with a $V \cdot De$ value below 500 cm$^2$ sec$^{-1}$ with a residence time of 32 seconds so that it is cooled down to 25° C.

The mixture is then passed over a vibrating sieve of 0.21 mm aperture. The lactoserum is run to storage and the casein is transferred to a vat in which it is mixed with three to four times its volume of water at 12° C. The temperature of the mixture of casein and wash water is 13.5° to 15° C and the period of washing is 8 to 14 minutes.

The casein/wash water mixture is then passed over a vibrating sieve of 0.21 mm aperture which retains the casein. The wash water is run to waste.

A rennet casein is obtained having the following analysis:

|  |  | % Dry basis |
|---|---|---|
| Total solids | 22–25% | 100 |
| Ash |  | 8–9 |
| Lactose |  | 1–4 |
| Total nitrogen |  | 11.5–12.5 |

EXAMPLE 2

Skimmed milk at a temperature between 10 and 15° C is pumped at a rate of 3,000 liters/hour through a tubular holding section of 35 mm diameter with a $V \cdot De$ value of 305 cm$^2$ sec$^{-1}$, close to the steam injector. Just after entering the tubular holding section, 30 percent HCl is pumped under pressure into the skimmed milk at a rate of 18 liters/hour using positive metering pumps. At the entrance of the tubular holding section steam is injected into the suspension to raise the temperature of the mixture to 50° to 55° C. The suspension passes through the tubular elements with a residence time of 45 seconds during which time the casein is coagulated. The mixture then passes through a size normalizing diaphragm of 12 mm aperture with a $V \cdot De$ value of 1000 cm$^2$ sec$^{-1}$ before entering a pasteurizer comprising tubular elements 55 mm in diameter. Before entering the pasteurizer, steam is injected to raise the temperature of the mixture to 70° C. The mixture passes through the pasteurizer with a $V \cdot De$ value of 200 cm$^2$ sec$^{-1}$ and a residence time of 60 seconds and thereafter through a second normalizing diaphragm of 12 mm aperture with a $V \cdot De$ value of 1000 cm$^2$ sec$^{-1}$. After the diaphragm, the mixture passes through water-jacketed cooling tubes (35 mm diameter) with a $V \cdot De$ value below 500 cm$^2$ sec$^{-1}$ with a residence time of 35 seconds so that it is cooled to 25° C.

The mixture is then passed over a vibrating sieve of 0.21 mm aperture. The lactoserum is run to storage and the casein is transferred to a vat in which it is mixed with three to four times its volume of water at 12° C. The temperature of the mixture of casein and wash water is 13.5° to 15.0° C and the washing time is 8 to 14 minutes.

The wash water is drained off again by passing the mixture over a vibrating sieve of 0.21 mm aperture.

The analysis of the casein thus obtained is as follows:

|  |  | % Dry basis |
|---|---|---|
| Total solids | 21–25% | 100 |
| Ash | — | 5–6 |
| Lactose | — | 0.3–1 |
| Total nitrogen | — | 13–13.5 |

The casein may be dried to a powder using the conventional methods.

EXAMPLE 3

Skimmed milk at a temperature between 5° and 10° C is pumped at a rate of 3,000 liters/hour through a tubular holding section of 35 mm diameter ($V \cdot De$ value 305 cm$^2$ sec$^{-1}$). At the entrance of this holding section the milk is heated to 50° to 55° C by direct steam injection and a 25 percent aqueous solution of Ca Cl$_2$ is then injected at a rate of 35 liters/hour just after the steam injector. The mixture passes through a holding section, size normalizing diaphragm, heater and pasteurizer under the conditions described in Examples 1 and 2.

The analysis of the casein obtained is as follows:

|  |  | % Dry basis |
|---|---|---|
| Total solids | 22–26% | 100 |
| Ash | — | 10–11 |
| Lactose | — | 1–4 |
| Total nitrogen | — | 12–13 |

EXAMPLE 4

In order to prepare potassium caseinate washed, undried casein prepared as in Example 2 is thoroughly mixed with about 5 percent of its weight of 30 percent potassium hydroxide solution. The pH of the suspension is then adjusted to a value from 6 to 7 by adding further potassium hydroxide or an acid as necessary. The caseinate suspension may then be dried by conventional methods.

We claim:

1. An improved process for separating casein from skimmed milk wherein milk is destabilized, heated to from 40° to 60° C with agitation to produce a slurry of casein in lactoserum, and passed through a first duct to a region where pasteurization takes place, after which said casein is separated from said lactoserum, wherein the improvement comprises the step of passing said slurry through a constricted portion of said first duct at a flow rate having a $V \cdot De$ value of at least 600 cm$^2$ sec$^{-1}$, $V$ being the mean streaming velocity of the slurry and $De$ being the hydraulic equivalent diameter of the duct at the point where measured.

2. A process according to claim 1, in which the milk is passed through the constricted portion at a $V \cdot De$ value of from 1,000 to 1,500 cm$^2$ sec$^{-1}$.

3. A process according to claim 1, in which the milk is heated by injecting steam into a stream of the milk.

4. A process according to claim 1, in which before heating, the milk is destabilized with rennet at a temperature not higher than 10° C.

5. A process according to claim 1, in which the flow through the first duct before the constricted portion has a $V \cdot De$ value in the range 300 to 450 cm$^2$ sec$^{-1}$.

6. A process according to claim 1, in which the pasteurization temperature is in the range 65° to 80° C and the slurry is heated to pasteurization temperature by direct steam injection.

7. A process according to claim 1, in which the slurry is passed through the second duct at a $V \cdot De$ value of from 200 to 300 cm² sec⁻¹.

8. A process according to claim 1, in which the slurry is passed through the second constriction at a $V \cdot De$ value in the range 1000 to 1900 cm² sec⁻¹.

9. A process according to claim 1, in which the separated casein is mixed with an aqueous solution or suspension of an alkali, the pH of the mixture is adjusted to a value in the range 6 to 7 and the caseinate is recovered from the mixture.

10. An improved process for separating casein from skimmed milk wherein milk is destabilized, heated to from 40° to 60° C with agitation to produce a slurry of casein in lactoserum and passed through a first duct having a constricted portion to a region where pasteurization takes place, after which said casein is separated from said lactoserum, wherein the improvement comprises the steps of passing said slurry through said first duct before reaching said constricted portion at a flow rate having a $V \cdot De$ value of less than 600 cm² sec⁻¹, the residence time in said duct before reaching the constricted portion being from 30 to 60 seconds, and passing said slurry through said constriction at a flow rate having a $V \cdot De$ value of from 1000 to 1500 cm² sec⁻¹, $V$ being the mean stream velocity and $De$ being the hydraulic equivalent diameter of the duct at the point where measured.

11. An improved process for separating casein from skimmed milk wherein said milk is destabilized, heated to from 40° to 60° C with agitation to produce a slurry of casein in lactoserum, passed through a first duct having a constricted portion and passed through a second duct, after which the casein is separated from said lactoserum, wherein the improvement comprises passing the slurry through said first duct at a flow rate having a $V \cdot De$ of 300 to 350 cm² sec⁻¹, through said constriction at a flow rate having a $V \cdot De$ of 1000 to 1500 cm² sec⁻¹, and through said second duct at a flow rate having a $V \cdot De$ value not exceeding 400 cm² sec⁻¹, and the residence time of said slurry in said second duct being from 30 to 60 seconds, $V$ being the streaming velocity of said slurry and $De$ being the hydraulic equivalent of a duct at the point where measured.

12. An improved process for separating casein from skimmed milk wherein said milk is destabilized, heated to from 40° to 60° C with agitation to produce a slurry of casein in lactoserum, passed through a first duct having a first constricted portion and through a second duct having a second constricted portion, after which said casein is separated from said lactoserum, wherein the improvement comprises the steps of passing said slurry through said first duct before reaching said first constriction at a flow rate having a $V \cdot De$ of less than 600 cm² sec⁻¹, said slurry having a residence time in said first duct before reaching said first constriction of 30 to 60 seconds, through said first constriction at a flow rate having a $V \cdot De$ of 1000 to 1500 cm² sec⁻¹, through said second duct before reaching said second constriction at a $V \cdot De$ value of 200 to 300 cm² sec⁻¹, said slurry being simultaneously pasteurized, and through said second constriction at a flow rate having a $V \cdot De$ value of at least 900 cm² sec⁻¹, $V$ being the mean streaming velocity of the slurry and $De$ being the hydraulic equivalent diameter at the point where measured.

* * * * *